(12) United States Patent
Hou et al.

(10) Patent No.: US 7,397,621 B2
(45) Date of Patent: Jul. 8, 2008

(54) SERVO PATTERN CHARACTERIZATION ON MAGNETIC DISKS

(75) Inventors: Zhen Hou, Milpitas, CA (US); Ronny Soetarman, Fremont, CA (US); Vamsi Velidandla, San Jose, CA (US); Steven W. Meeks, Fremont, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 182 days.

(21) Appl. No.: 11/432,609

(22) Filed: May 11, 2006

(65) Prior Publication Data

US 2006/0215289 A1 Sep. 28, 2006

Related U.S. Application Data

(63) Continuation-in-part of application No. 10/867,609, filed on Jun. 14, 2004, now Pat. No. 7,075,741.

(51) Int. Cl.
G11B 5/02 (2006.01)
(52) U.S. Cl. .......................... 360/25; 360/75; 360/77.04; 360/51
(58) Field of Classification Search .................. 360/25, 360/31, 51, 53, 75, 77.04
See application file for complete search history.

(56) References Cited

U.S. PATENT DOCUMENTS

| | | | |
|---|---|---|---|
| 4,585,348 A | 4/1986 | Chastang | |
| 4,870,631 A | 9/1989 | Stoddard | |
| 4,873,430 A | 10/1989 | Juliana | |
| 5,189,481 A | 2/1993 | Jann | |
| 5,270,794 A | 12/1993 | Tsuji | |
| 5,392,116 A | 2/1995 | Makosh | |
| 5,416,594 A | 5/1995 | Gross | |
| 5,473,480 A | * 12/1995 | Ishida | 360/51 |
| 5,610,897 A | 3/1997 | Yamamoto | |
| 5,633,747 A | 5/1997 | Nikoonahad | |
| 5,644,562 A | 7/1997 | de Groot | |
| 5,761,165 A | * 6/1998 | Takeda et al. | 360/51 |
| 5,798,829 A | 8/1998 | Vurens | |
| 5,815,485 A | * 9/1998 | Tanaka et al. | 369/275.3 |
| 5,864,394 A | 1/1999 | Jordan | |
| 5,880,838 A | 3/1999 | Marx | |
| 5,903,342 A | 5/1999 | Yatsugake | |
| 5,909,333 A | * 6/1999 | Best et al. | 360/51 |
| 5,920,441 A | * 7/1999 | Cunningham et al. | 360/78.05 |
| 5,985,689 A | 11/1999 | Singhai | |
| 5,986,763 A | 11/1999 | Inoue | |
| 5,995,226 A | 11/1999 | Abe | |
| 6,002,540 A | * 12/1999 | Cunningham et al. | 360/77.04 |
| 6,031,615 A | 2/2000 | Meeks | |
| 6,081,325 A | 6/2000 | Leslie | |

(Continued)

*Primary Examiner*—Hoa T. Nguyen
*Assistant Examiner*—Dismery E Mercedes
(74) *Attorney, Agent, or Firm*—Caven & Aghevli LLC

(57) ABSTRACT

In one embodiment, a surface analyzer system comprises a radiation targeting assembly to target radiation onto a surface, a reflected radiation collecting assembly that collects radiation reflected from the surface, and a signal processing module. The signal processing module generates an image of magnetic characteristics of the magnetic disk, wherein the image comprises a plurality of servo sector arcs, locates a sample of points on a plurality of the servo sector arcs, fits a circle to the sample of points on each of the plurality of servo sector arcs, and determines at least one pivot-to-gap measurement from the radius of the circles.

17 Claims, 15 Drawing Sheets

U.S. PATENT DOCUMENTS

| | | | | |
|---|---|---|---|---|
| 6,130,749 | A | 10/2000 | Meeks | |
| 6,144,517 | A * | 11/2000 | Watanabe et al. | 360/77.04 |
| 6,198,533 | B1 | 3/2001 | Meeks | |
| 6,204,989 | B1 * | 3/2001 | Hrinya et al. | 360/77.06 |
| 6,229,610 | B1 | 5/2001 | Meeks | |
| 6,268,919 | B1 | 7/2001 | Meeks | |
| 6,377,413 | B1 * | 4/2002 | Sacks et al. | 360/48 |
| 6,392,749 | B1 | 5/2002 | Meeks | |
| 6,624,884 | B1 | 9/2003 | Imaino | |
| 6,665,078 | B1 | 12/2003 | Meeks | |
| 6,687,008 | B1 | 2/2004 | Peale et al. | |
| 6,704,435 | B1 | 3/2004 | Imaino | |
| 6,717,671 | B1 | 4/2004 | Meeks | |
| 6,751,044 | B1 | 6/2004 | Meeks | |
| 6,757,056 | B1 | 6/2004 | Meeks | |
| 6,781,103 | B1 | 8/2004 | Lane | |
| 6,954,323 | B2 * | 10/2005 | Deeman et al. | 360/51 |
| 7,167,333 | B1 * | 1/2007 | Liikanen et al. | 360/75 |
| 7,236,324 | B2 * | 6/2007 | Albrecht et al. | 360/75 |
| 2002/0015146 | A1 | 2/2002 | Meeks | |
| 2002/0145740 | A1 | 10/2002 | Meeks | |
| 2002/0163634 | A1 * | 11/2002 | Meeks et al. | 356/73 |
| 2003/0025905 | A1 | 2/2003 | Meeks | |
| 2004/0017561 | A1 | 1/2004 | Meeks | |
| 2004/0046959 | A1 | 3/2004 | Meeks | |
| 2004/0160604 | A1 | 8/2004 | Meeks | |
| 2004/0169850 | A1 | 9/2004 | Meeks | |
| 2004/0233419 | A1 | 11/2004 | Meeks | |
| 2005/0057747 | A1 | 3/2005 | Meeks | |
| 2005/0141134 | A1 * | 6/2005 | Roth | 360/97.01 |

* cited by examiner

Radial direction

Circumferential direction

Radial direction

Circumferential direction

← Magnetic pattern edge

← Magnetic pattern edge

← Magnetic pattern edge

← Magnetic pattern edge

SERVO PATTERN CHARACTERIZATION ON MAGNETIC DISKS

RELATED APPLICATIONS

This application is a continuation-in-part of U.S. patent application Ser. No. 10/867,609, filed Jun. 14, 2004, now U.S. Pat. No. 7,075,741 entitled System and Method for Automatically Determining Magnetic Eccentricity of a Disk, the disclosure of which is incorporated herein by reference.

TECHNICAL FIELD

The subject matter described herein relates to the field of disk drives and more particularly to servo pattern characterization on magnetic disks.

BACKGROUND

When a hard disk is manufactured a special pattern is written in a code called a Gray code on the surface of the platters, while the drive is open in a clean room, with a machine called a servo writer. Conventional servo writing is performed in a clean room environment with external sensors invading a disk-drive head disk assembly to provide the precise angular and radial position information to write the servo patterns on the disk.

There are a fixed number of servo sectors per track and the sectors are adjacent to one another. This pattern is permanent and cannot be changed by writing normal data to the drive.

The electronics use feedback from the heads, which read the Gray code pattern, to very accurately position, and constantly correct the radial position of the appropriate head over the desired track, at the beginning of each sector, to compensate for variations in platter geometry, caused by mechanical stress and thermal expansion and contraction. Altogether, the head positioning components form what is known as closed-loop servo system—a marvelous (and, perhaps, dangerous) thing to watch operate in a drive which has been opened.

Recently, tools have been developed that write the servo pattern on multiple disks prior to the assembly of the drive head. This process can increase the rate at which servo patterns are written, however the tolerances need to be very small between the center of the servo pattern and physical center of the disk in order to enable a subsequently attached thin film disk head to be able to read and write onto the thin film magnetic disk.

What is needed is an automatic way of measuring the servo pattern and physical disk to identify a difference between the center of a servo pattern and the center of the physical disk in order to keep the distance between the two centers within a specified tolerance.

SUMMARY OF THE INVENTION

An embodiment of the present invention includes a surface analyzer system, comprising a radiation targeting assembly to target radiation onto a surface, a reflected radiation collecting assembly that collects radiation reflected from the surface, and a signal processing module. The signal processing module generates an image of magnetic characteristics of the magnetic disk, wherein the image comprises a plurality of servo sector arcs, locates a sample of points on a plurality of the servo sector arcs, fits a circle to the sample of points on each of the plurality of servo sector arcs, and determines at least one pivot-to-gap measurement from the radius of the circles.

DETAILED DESCRIPTION

Figure 1:
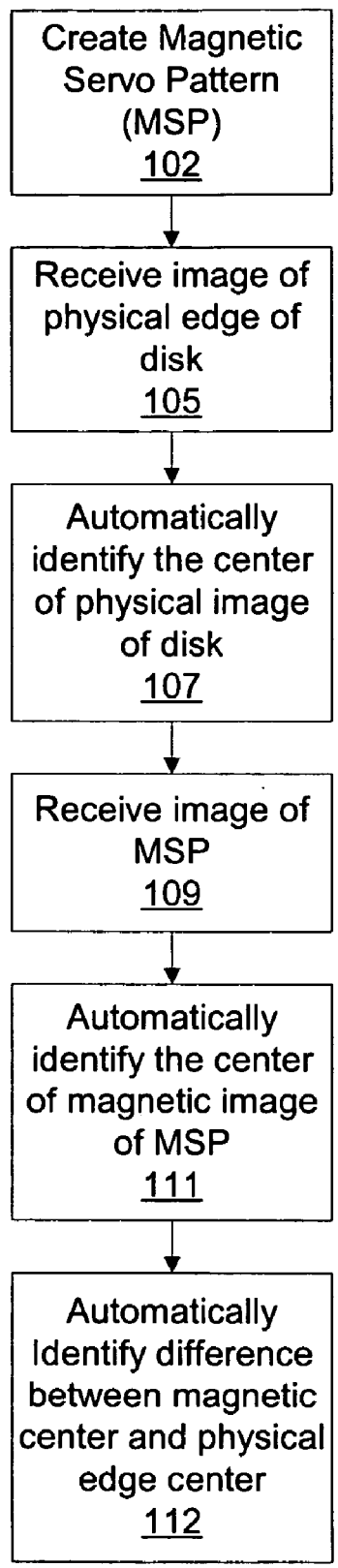
FIG. 1 is a flowchart illustrating the method of the present invention according to one embodiment of the present invention.

Embodiments are described with reference to the figures where like reference numbers indicate identical or functionally similar elements. Also in the figures, the left most digit(s) of each reference number may correspond to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not necessarily related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

As described above, the present invention receives a disk having servo pattern and automatically identifies the center of the servo pattern. The present invention also automatically identifies the center of the physical disk and then automatically identifies the variance (magnetic eccentricity) between the center of the servo pattern and the physical disk center. The magnetic eccentricity of a disk is the distance between the physical center of a disk and the pattern center of the disk, e.g., as prescribed by the magnetic write pattern on the disk. Automatically identifying the magnetic eccentricity provides advantages including providing a detailed description of the disk that can be provided to the disk head controller to facilitate calibration of the disk head on a disk. The magnetic pattern written upon the disk may be a servo pattern or any other type of pattern, which is continuous or discrete around the circumference of the magnetic disk.

FIG. 1 is a flowchart illustrating a method of according to one embodiment of the present invention. A magnetic servo pattern (MSP) is created 102 on a disk. This can be accomplished using conventional techniques either before or after the disk is combined in the disk unit having a disk head for reading and/or writing data to the disk. The present invention also receives 105 (or creates) an image of the physical edge of the disk and automatically identifies 107 the center of the physical edge of the disk. Some of the possible techniques for accomplishing this are described below.

The present invention receives 102 the disk and identifies 109 the magnetic servo pattern on the disk. The present invention can identify 109 the magnetic servo pattern using one or more techniques. Some of the possible techniques for accomplishing this are described below. In one embodiment, an image of the magnetic servo pattern is created. The present invention then automatically identifies 111 the center of the magnetic servo pattern image.

The present invention then automatically identifies 112 the magnetic eccentricity of the disk, i.e., the present invention automatically identifies the difference between the magnetic center and the physical center of the disk. It is envisioned that the steps outlined in FIG. 1 can be performed in an order different from that described above without departing from the scope of the present invention.

Figure 2:
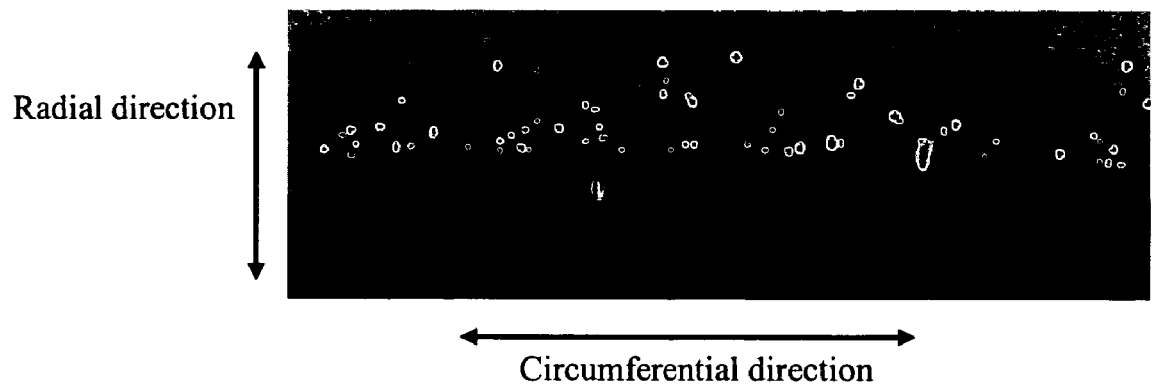
FIG. 2 is an illustration of a sub-image that includes the inner diameter edge according to one embodiment of the present invention.

After creating or receiving 105 an image of the physical edge of the disk the present invention automatically identifies 107 the physical center of the disk. This can be accomplished in a variety of ways. In one embodiment the present invention creates a sub-image which includes the inner diameter edge. In alternate embodiments the outer edge is used. FIG. 2 is an illustration of a sub-image that includes the inner diameter edge identified as the region separating the dark and light portions where the light portion represents the disk.

The image can be created using an optical surface analyzer to acquire a magnetic image of the disk from, for example, the outside edge of the disk to the inside diameter of the disk. Such an optical surface analyzer that can be used to create such an image is the OSA 6100 or OSA 5100 that is available from KLA-Tencor of San Jose, Calif. In one embodiment of the present invention the edge is more clearly identified by performing a filtering operation. For example, in one embodiment a track-by-track median filtering operation is performed in the circumferential direction to reduce image noise. The track-by-track median filtering belongs to a class of filter called nonlinear filters. As an example, consider a row of pixel data that begins with the following values:

| Value | 23 | 65 | 64 | 120 | 187 | 90 | 47 | 209 | 72 | 53 | 91 | 97 | 99 |
|---|---|---|---|---|---|---|---|---|---|---|---|---|---|
| Index | 1 | 2 | 3 | 4 | 5 | 6 | 7 | 8 | 9 | 10 | 11 | 12 | 13 |

Suppose we have picked that our kernel length for the circumferential median filter is 9 pixels, that means from the beginning of the data we are looking at these 9 data values: 23 65 64 120 187 90 47 209 72

Now we order (rank) these 9 data values in increasing value:

23 47 64 65 72 90 120 187 209

The median value of the ordered list of values is 72, which means that there are as many elements below this median value (4 elements) as there are above this median value. So the data with index 5 which has original value of 187 is now being replaced with the median value which is 72. So the filtered row of data will look something as follows:

| Value | 23 | 65 | 64 | 120 | 72 | ... |
|---|---|---|---|---|---|---|
| Index | 1 | 2 | 3 | 4 | 5 | 6 |

Index 1, 2, 3 and 4 values are not replaced since they occur before half of the kernel length. However index 6, 7, 8 and so on can now be determined by moving the kernel by one more index. So for index 6, the new values in the kernel are:

65 64 120 187 90 47 209 72 53

Then the above set of values will be re-ordered and ranked to determine the median value, and that median value will be the new value for index 6. The process is repeated until the whole data in the image is processed.

Figure 3:
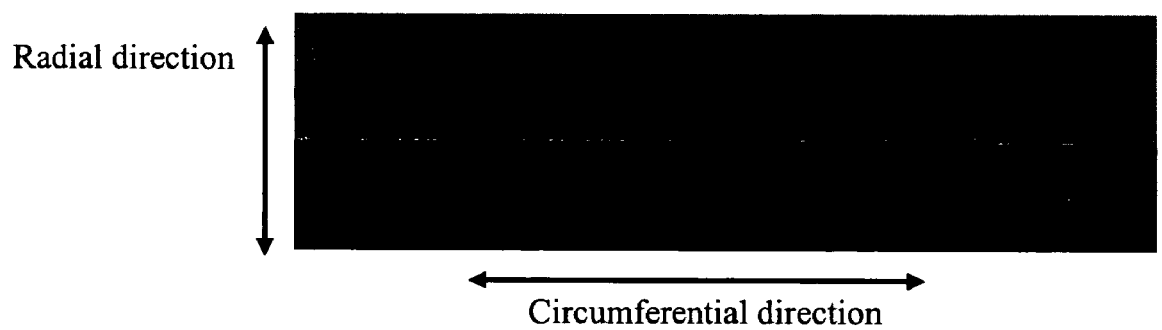
FIG. 3 is an illustration showing the inner diameter edge after the circumferential median filtering operation according to one embodiment of the present invention.

This circumferential filter is performed to reduce/remove the noise or irregularities on the disk edge. FIG. 3 is an illustration showing the inner diameter edge after the circumferential median filtering operation according to one embodiment of the present invention.

Figure 4:
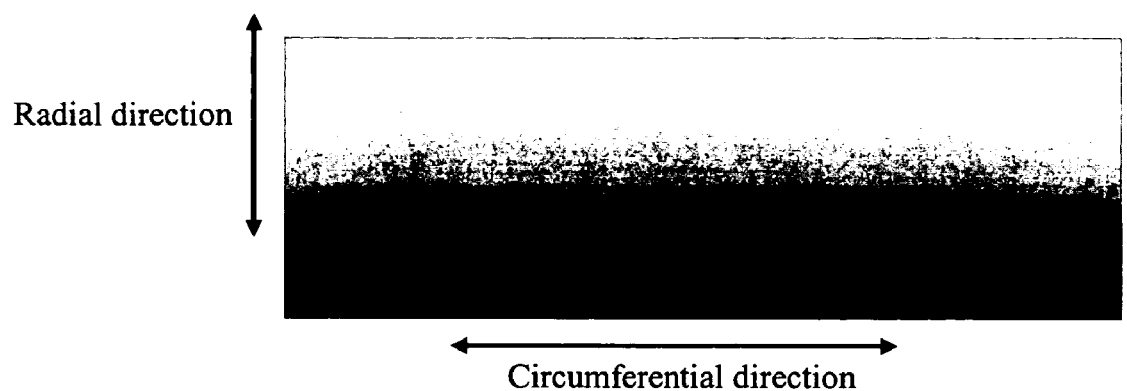
FIG. 4 is an illustration showing the inner diameter edge after the radial median filtering operation according to one embodiment of the present invention.

In one embodiment additional filtering can also be performed. For example a radial column by radial column median filtering operation along the radial direction can be performed to further reduce noise or irregularities on the disk edge. This type of filtering is similar to the circumferential filtering described above but in the radial direction. FIG. 4 is an illustration showing the inner diameter edge after the radial median filtering operation according to one embodiment of the present invention.

Figure 5:
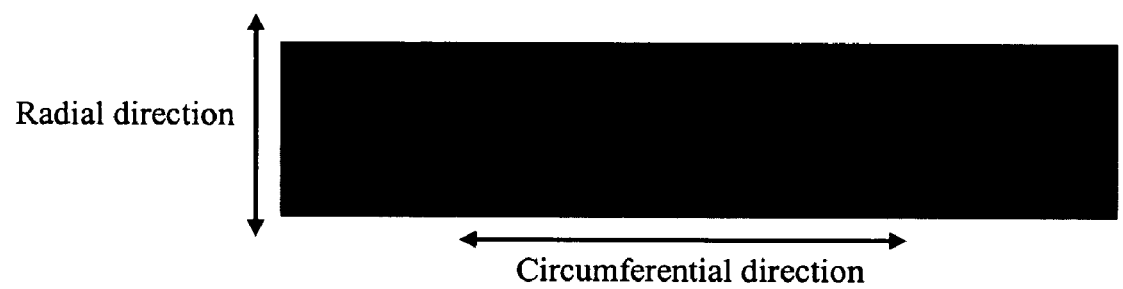
FIG. 5 is an illustration of an inner diameter edge after applying the horizontal edge detection technique according to one embodiment of the present invention.

Some embodiments of the present invention apply a conventional two-dimensional Laplacian horizontal edge detection to filter. Additional details about the two-dimensional Laplacian horizontal edge detection is found in "Digital Imaging" by Howard E. Burdick, McGraw-Hill, New York, 1997, pages 105-109. The two-dimensional horizontal edge detection is performed by using a convolution operation with a two dimensional kernel. By performing a convolution operation with this special kernel, the resulting image is uniform everywhere except where there is a horizontal feature. FIG. 5 is an illustration of an inner diameter edge after applying the horizontal edge detection technique according to one embodiment of the present invention. The horizontal disk edge is extracted based upon either the minimum or maximum pixel values. In FIG. 5 the dark line (minimum pixel values) corresponds to the disk edge.

Figure 6:
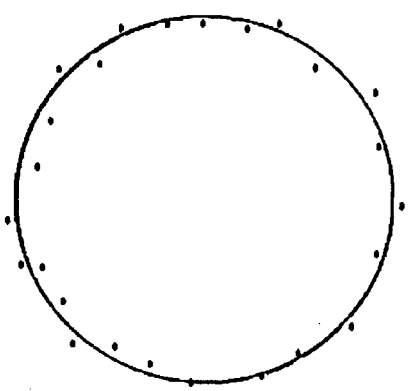
FIG. 6 illustrates the operation of a circle fit algorithm on multiple servo sectors according to one embodiment of the present invention.

In one embodiment of the present invention a circle fit algorithm uses the edge data for multiple servo sectors or the edge data for the inner diameter of the disk to identify a circle that best fits the identified edges. FIG. 6 illustrates the operation of a circle fit algorithm on multiple servo sectors. In FIG. 6 each servo sector is identified by a point while in some embodiments the edge (or some portion thereof) identified for multiple servo sectors is used by the circle fit algorithm. In FIG. 6 the dots represent the extracted edge and the circle drawing represents the estimated/fitted circle that will minimize the error from the dots to the fitted circle. The circle fit algorithm also calculates the center for the circle along with the radius. One example of a circle fit algorithm is described in C. L. Lawson & R. J. Hanson, Jet Propulsion Laboratory, "Solving Least Squares Problems" (Prentice Hall, 1974) which is incorporated by reference herein in its entirety.

As indicated above, the present invention envisions alternate techniques can be used to identify the physical center of the disk or the center of the magnetic pattern without departing from the present invention.

Figure 7:
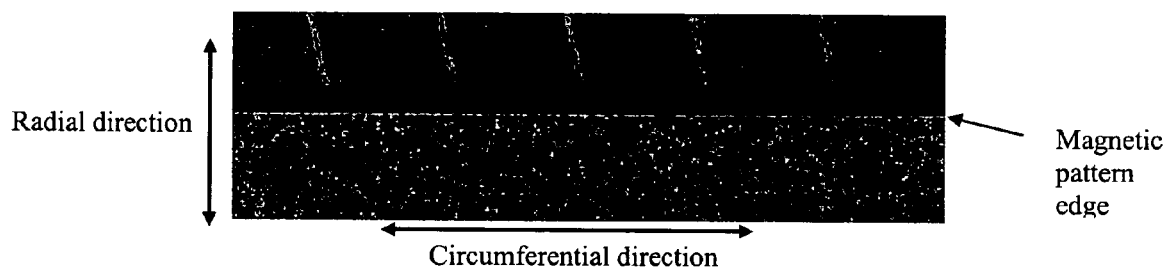
FIG. 7 is an illustration of a sub-image of the magnetic pattern edge where the magnetic pattern has a substantially uniform level across the circumferential direction according to one embodiment of the present invention.
Figure 8:
FIG. 8 is an illustration of a magnetic pattern edge after filtering and edge detection according to one embodiment of the present invention.

After receiving 109 the image of the magnetic servo pattern, the present invention automatically identifies 111 the center of the magnetic image of the magnetic servo pattern. It is envisioned that this identification can be accomplished in a variety of ways without departing from the scope of the present invention. In one embodiment, the edge of the magnetic boundary is detected using a filtering technique similar to that described above with respect to identifying the physical edge. A sub-image of the magnetic pattern is created using, for example, the Candela OSA 6100 or OSA 5100 optical surface analyzer identified above. FIG. 7 is an illustration of a sub-image of the magnetic pattern edge where the magnetic pattern has a substantially uniform level across the circumferential direction according to one embodiment of the present invention. In one embodiment circumferential and/or radial median filtering is used using the technique described above and then a horizontal edge detection technique is used, as described above. FIG. 8 is an illustration of a magnetic pattern edge after filtering and edge detection according to one embodiment of the present invention. In this example the light area represents the magnetic pattern edge.

Figure 9:
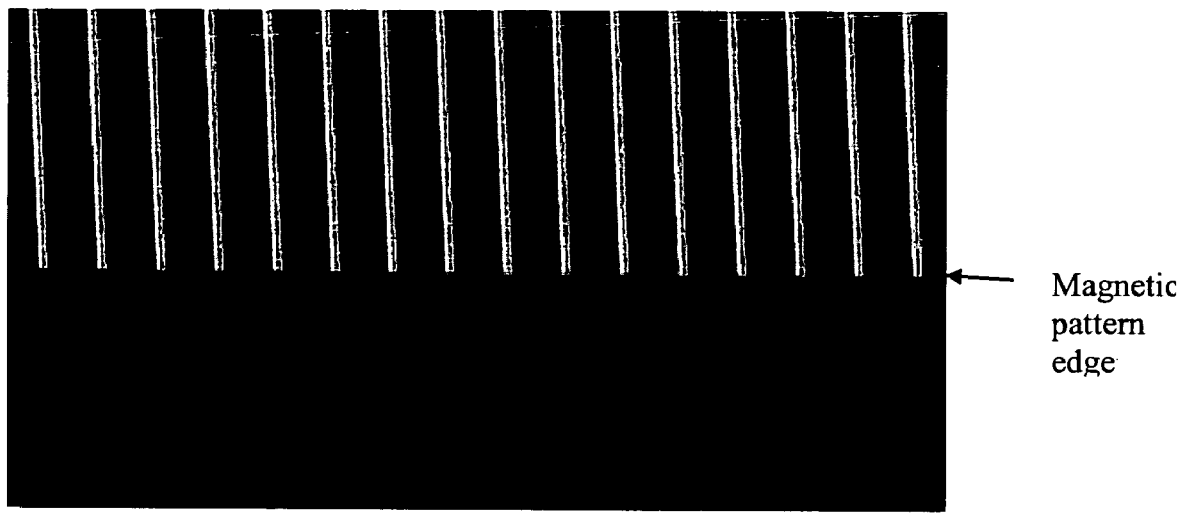
FIG. 9 is an illustration of a magnetic image boundary according to one embodiment of the present invention.
Figure 10:
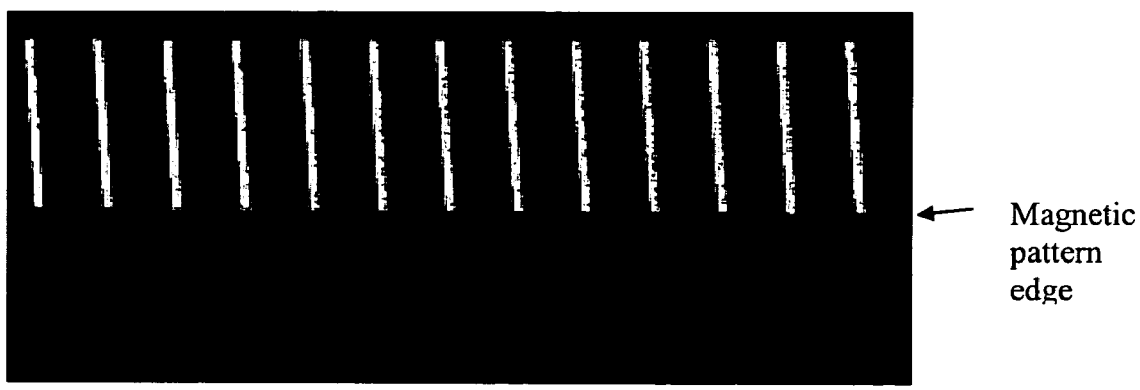
FIG. 10 is an illustration of a magnetic pattern image after applying a one-dimensional kernel algorithm according to one embodiment of the present invention.

In some processes the magnetic pattern is not substantially uniform across the circumferential direction. Instead, the magnetic image pattern boundary is identified as vertical stripes. FIG. 9 is an illustration of a magnetic image boundary according to one embodiment of the present invention. A sub-image of the magnetic pattern is received or created. In one embodiment of the present invention a feature base detection based upon a one-dimensional kernel and a positive and/or negative threshold is used to create a higher contrast image of the magnetic pattern. This can be accomplished using a one-dimensional horizontal median filter kernel along with a threshold to detect all the pixels which lie above (or below) the medial value by an amount greater than the threshold. The kernel length must be longer than the horizontal length of the magnetic servo wedge (the white vertical bars in FIGS. 9 and 10). FIG. 10 is an illustration of a magnetic pattern image after applying a one-dimensional kernel algorithm according to one embodiment of the present invention.

Figure 11:
FIG. 11 is an illustration of the bottom edges of the magnetic pattern image after applying a one-dimensional kernel algorithm according to one embodiment of the present invention.

In one embodiment of the present invention, the edge (for example the bottom edge) of the features is identified. FIG. 11 is an illustration of the bottom edges of the magnetic pattern image after applying a one-dimensional kernel algorithm according to one embodiment of the present invention.

In one embodiment a one-dimensional kernel with a threshold is applied to the image (FIG. 9) in the horizontal direction. This generates a detected map with all the features that are outside the specified threshold as shown in FIG. 10. The detected features are then examined and features smaller than a certain specified value (for example, 10 pixels) are ignored. For all the larger features, the bottom boundary is located and this is the inner edge of magnetic marking (the servo pattern). This is identified as the bottom edge in FIG. 11.

A circle fit algorithm, such as that described above, can be used to identify the circle that best fits the magnetic pattern image. The circle fit algorithm will also identify the center of the circle and the radius.

The magnetic eccentricity is automatically identified 112 by determining the difference between the center of the disk and the center of the magnetic pattern.

In alternative embodiments, the magnetic servo pattern can be measured or identified using any of a variety of techniques including using a polar Kerr effect, a longitudinal Kerr effect, a transverse Kerr effect, and/or a Bitter magnetic imaging technique. The three Kerr effects: polar, longitudinal and transverse are optical means of imaging magnetic patterns. The three Kerr effects differ with regards to the orientation of the magnetization with respect to the polarization of the optical beam and in the strength of their response to magnetic patterns, with the Polar Kerr effect having the strongest response to a change in magnetic orientation and the longitudinal and transverse having much smaller responses. For a conventional longitudinally recorded magnetic disk the longitudinal or transverse Kerr effect would be the mechanism responsible for magnetic imaging. For a perpendicularly recorded magnetic disk the Polar Kerr effect would be the mechanism responsible for magnetic imaging.

The Bitter magnetic imaging technique consists of decorating the surface of a magnetic disk with a fluid that contains a suspension of tiny magnetic particles. As the suspending fluid evaporates, the magnetic particles will be attracted to the positive and negative poles of the magnetized areas on the disk. In this manner the magnetic pattern on the thin film disk may be imaged.

Figure 12:
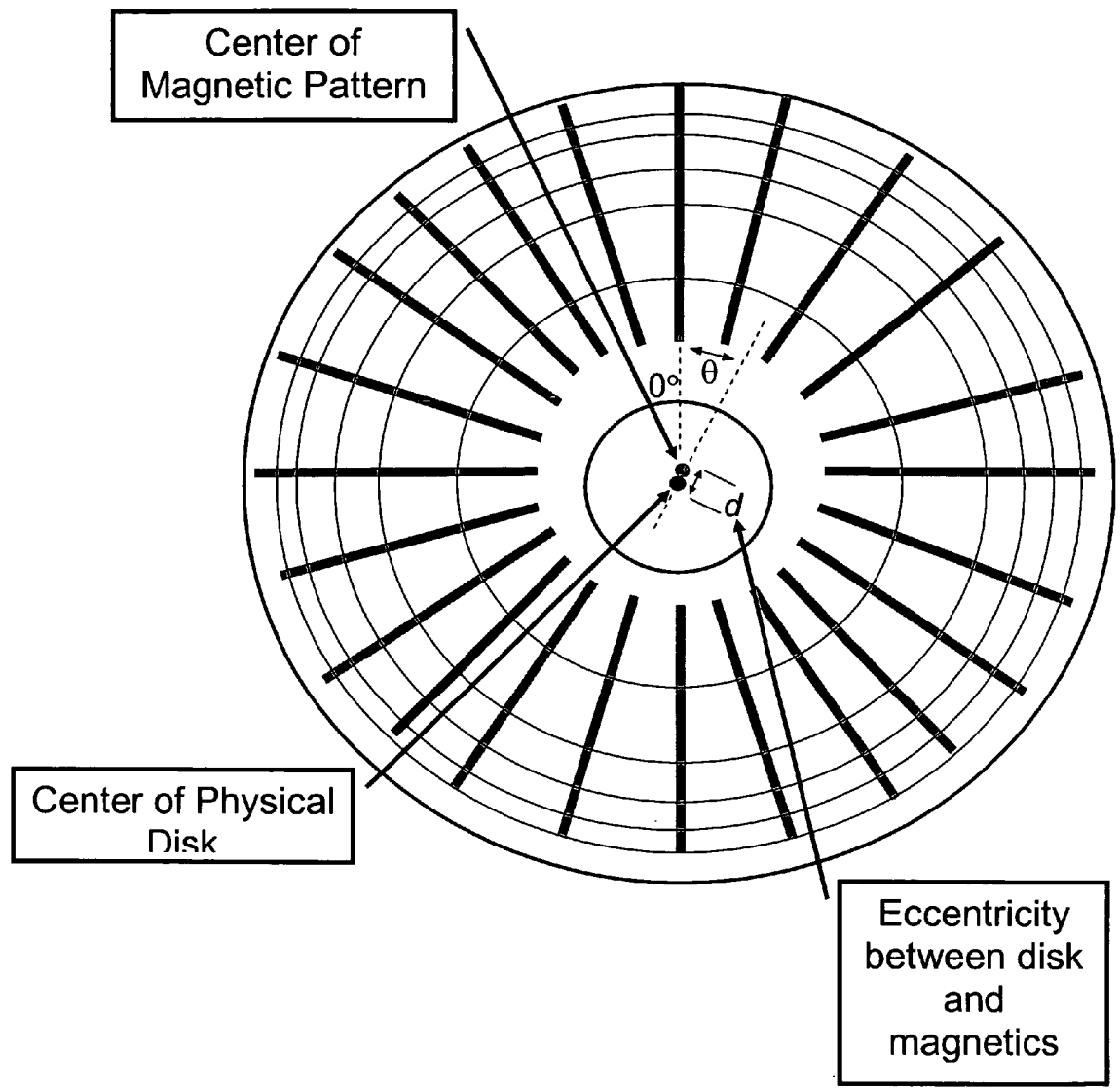
FIG. 12 is an illustration of the magnetic pattern and the disk physical edges showing the magnitude of the eccentricity and the angle the eccentricity makes with respect to a reference position on the disk according to one embodiment of the present invention.

FIG. 12 shows an illustration of the disk magnetic pattern and the disk physical edges. The disk physical center is separated from the magnetic pattern center by a distance d. This distance d is oriented at an angle θ with respect to a reference angle on the disk. In this case, the reference angle is the zero degree position shown in FIG. 12. This method will allow the computation of both the distance d and the angle θ.

In addition to, or in lieu of, identifying the magnetic eccentricity of a disk, magnetic characteristics such as, e.g., a pivot-to-gap distance measurement and a center-to-center distance measurement may be identified. As described above, magnetic disks may be encoded with one or more servo patterns during manufacture. The servo pattern may be used to accurately position and correct the radial position of the appropriate read/write head in relation to the desired track on the disk at the beginning of each sector, to compensate for variations in platter geometry, caused by mechanical stress and thermal expansion, contraction and mechanical vibration.

Figure 13:
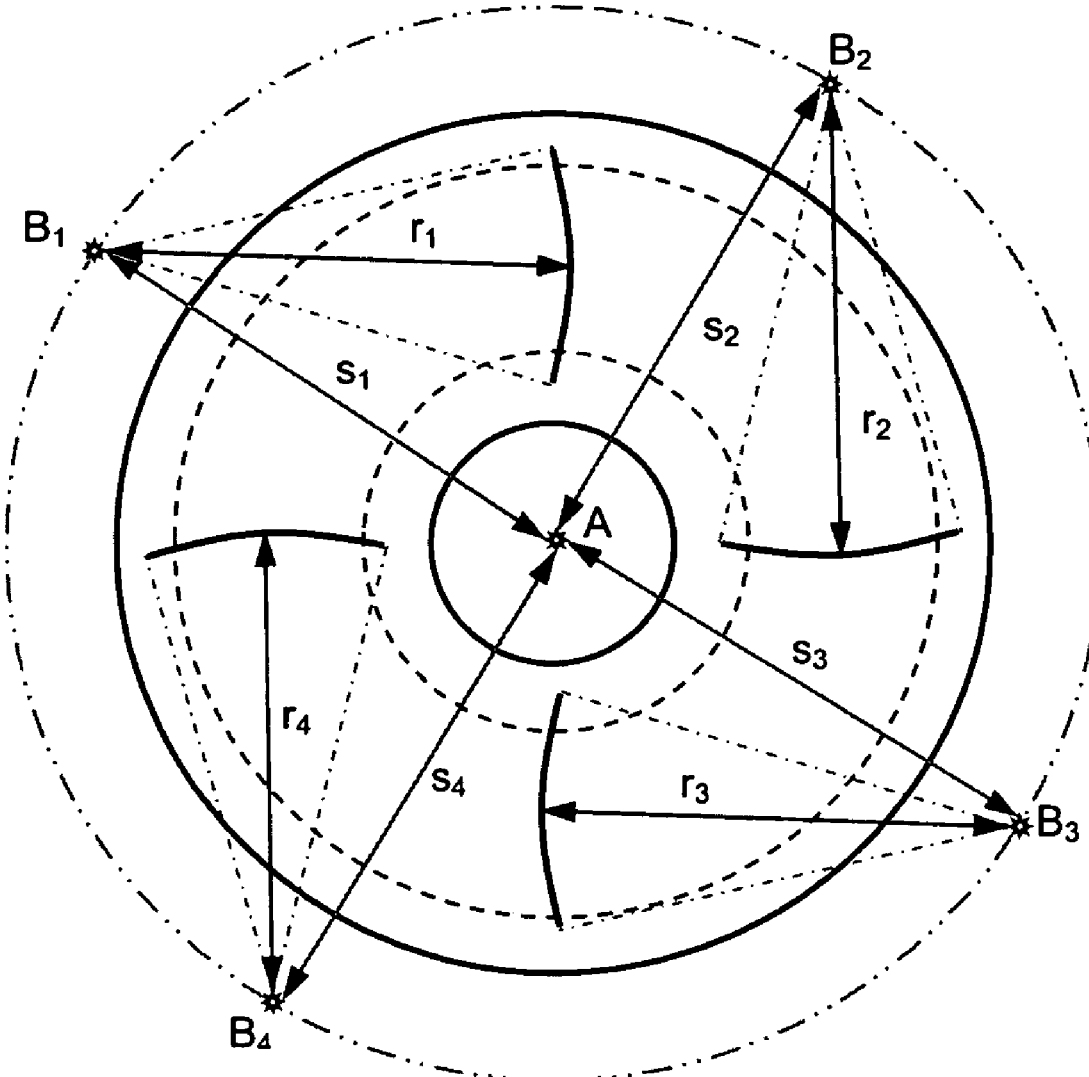
FIG. 13 is a schematic illustration of a servo pattern on a magnetic disk.

FIG. 13 is a schematic illustration of a servo pattern on a magnetic disk. Referring to FIG. 13, a magnetic disk may include a number (n) of servo sectors evenly distributed on the disk. Each servo sector line appears as an arc on a magnetic image of the disk. The arc defines a small section of a circle of radius r which is centered at an actuator pivot. In the embodiment of FIG. 13, the magnetic disk comprises four actuator pivots, identified in the drawing by references B1, B2, B3, B4, and four servo lines, which are disposed respectively at a pivot-to-gap distance corresponding to the radius r1, r2, r3, r4 from the actuator pivots B1, B2, B3, B4. The center-to-center distance measurement refers to the distance $s_1$, $s_2$, $s_3$, $s_4$ between the actuator pivots B1, B2, B3, B4 and the center of the magnetic pattern (A).

The pivot-to-gap distances and the center-to-center distances are two important geometric measurements of the servo pattern. Thus, techniques to automatically measure the pivot-to-gap and center-to-center distances for a patterned hard disk are useful to manufacturers of magnetic disks, for example, to keep the variations of these geometrical measurements under acceptable tolerance.

While the embodiment depicted in FIG. 13 includes four servo tracks, in practice a magnetic disk may include a greater or lesser number of servo tracks. Currently, magnetic disks may include as many as 80 to 400 servo sector lines.

By way of overview, in one embodiment a technique for measuring includes acquiring an image of magnetic characteristics of the magnetic disk. The magnetic image of the disk will include a plurality of servo sector arcs. A sample of points on a plurality of the servo sector arcs is collected, and a circle is fitted to the sample of points on each of the plurality of servo sector arcs. Pivot-to-gap measurements and center-to-center measurements may be determined from the radius and the center of the circles fitted to the servo arcs.

Figure 23:
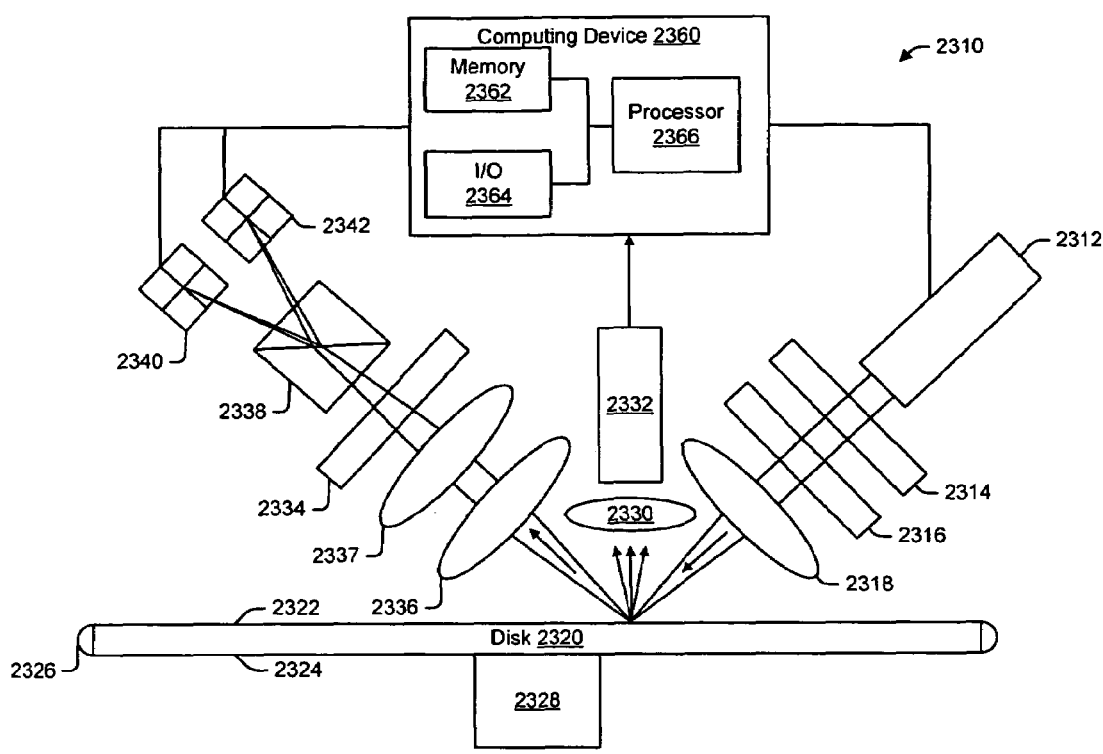
FIG. 23 is a schematic illustration of an optical surface analyzer which may be used to acquire an image of magnetic characteristics of magnetic disks.

As described above, the image can be created using an optical surface analyzer to acquire a magnetic image of the servo pattern on the disk from, for example, the outside edge of the disk to the inside diameter of the disk. FIG. 23 is a schematic illustration of an optical surface analyzer which may be used to acquire an image of magnetic characteristics of magnetic disks. More particularly, FIG. 23 depicts an optics assembly that includes a combined reflectometer, scatterometer, phase shift microscope, magneto-optic Kerr effect microscope and optical profilometer. This embodiment is capable of detecting and classifying a wide variety of defects on a thin film disk. The Kerr effect microscope portion of this device can be used to detect the servo track on a thin film disk.

Disk 2320 includes an upper surface 2322 which is substantially flat.

A surface analyzer assembly 2310 is positioned to direct radiation onto a surface of disk 2320. In the embodiment depicted in FIG. 23, surface analyzer assembly 2310 includes a laser diode 2312, an optional polarizer 2314, an optional half-wave plate 2316, and a focusing lens 2318 for directing radiation onto a surface of disk 2320. These components target radiation from the laser diode onto the surface of disk 2320, and hence may be considered a radiation targeting assembly. In alternative embodiment polarizer 2314 and half-wave plate 2316 may be omitted.

Surface analyzer assembly 2310 further includes a collecting lens 2330 and a photomultiplier tube (PMT) 2332. These components collect radiation scattered by the surface of the disk 2320, and hence may be considered a scattered radiation assembly. In alterative embodiments the PMT 2332 and collecting lens 2330 may be replaced with an integrating sphere or an ellipsoidal mirror together with a PIN photodiode or avalanche photo diode.

Surface analyzer assembly 2310 further includes a collimating lens 2336, a wobble reduction lens 2337, a quarter wave plate 2334, a Wollaston prism 2338 rotated at 45 degrees to the plane of incidence, and two quadrant detectors 2340, 2342 available from Hamamatsu, Inc. In another embodiment detectors 2340, and 2342 may be PIN photodetectors also available from Hamamatsu, Inc. The embodiment shown in FIG. 23 utilizes quadrant detectors so that the slope of the surface may be measured. The surface slope may be integrated to produce the surface profile. These components collect radiation reflected from the surface of disk 2320, and hence may be considered a reflected radiation assembly. The wobble reduction lens 2337 is a converging lens. In alternative embodiments the wobble reduction lens 2337 and the collimating lens 2336 may be combined into a single lens. The wobble reduction lens is chosen so that its focal length is substantially equal to the distance between wobble reduction lens 2337 and the quadrant detectors 2340 and 2342. When this is done the surface slope measured at the quadrant detectors will be minimized. That is, the system will be most tolerant of wobble of the disk. Another embodiment would position the detectors 2340 and 2342 at a distance slightly longer or shorter than the focal length of the wobble reduction lens 2337. In this case the system would have some sensitivity to both disk wobble and to surface slope. In other embodiments the wobble reduction lens 2337 may be omitted.

In one embodiment surface analyzer assembly 2310 uses a multi-mode, multi-wavelength laser diode 2312 which is available from Rohm Co., LTD Kyoto, Japan as model number RLD-78MV and a polarizer 2314 which is adjusted for P polarization and improves the extinction ratio of the laser. The radiation may be of any wavelength. In one embodiment a 405 nm violet source available from Coherent, Inc may be implemented. In another embodiment a 635 nm source may be implemented. The mechanically rotatable half wave plate 2316 is available from CVI Laser Corp. and can be used to rotate the polarization between 45 degrees, and P or S polarization's. The half wave plate may be replaced with a quarter wave plate which is rotated at 45 degrees to the incident polarization. This will result in circular polarization incident upon the disk. A quarter wave plate which is rotated at angles other than 45 degrees to the incident polarization will result in elliptical polarization incident upon the disk. Alternative techniques for rotating the polarization include rotating the laser diode 2312 or to use a liquid crystal polarization rotator such as model LPR-100 available from Meadowlark Optics, Frederick, Colo. The latter embodiment has the advantage of being a purely electronic means of polarization rotation and as a result there is no possibility of beam movement when the polarization is rotated.

Focusing lens 2318 creates a small spot on the surface of a disk 2320. The PMT 2332 and collecting lens 2330 are used to measure the scattered light for the purposes of computing the surface roughness, measuring debris, detecting stains, cracks, scratches, delaminations, blisters or corrosion on the disk 2320 surface regions.

After reflecting from the disk, the beam passes through the collimating lens 2336, the wobble reduction lens 2337, and a quarter-wave plate 2334. The beam is then polarization split with a Wollaston prism 2338 available from CVI Laser Corp., for example, and each polarization component is detected with separate photodetectors 2340, 2342. The plane of the Wollaston prism (the plane of the S and P components) may be adjusted at substantially 45 degrees to the plane of incidence. The first mixed component of the beam (which includes both P and S components with respect to the plane of incidence) is directed to a detector 2340 and the second mixed component (which includes both P and S components with respect to the plane of incidence) is directed to a second detector 2342. In one embodiment the photodetectors 2340, 2342 may have a diffuser placed in front of them to reduce the residual position sensitivity of the photodiodes. The difference between the intensity measured by the photodetectors is proportional to the cosine of the phase difference between the first and second mixed components coming from the Wollaston prism. As a result this instrument can get different types of information when used in different modes.

When the polarization is adjusted to P, the P specular and P scattered light is measured resulting in sensitive measurements of carbon thickness (or any simple layer thickness) and carbon wear. The P specular signal is obtained by rotating the half wave plate 2316 so that the polarization output from the half wave plate is P polarized. The P specular signal is given by the sum of the signal from detectors 2340 and 2342. When the polarization is adjusted to 45 degrees (exactly between P and S polarization) the instrument is most sensitive to measurements of the phase change induced by changes in the thickness of the thin films on the disk surface. In the phase shift mode the instrument measures lubricant, carbon, or other film thickness changes on thin film disks. The phase shift is measured by taking the difference between the signals measured at detectors 2342 and 2340. This gives an output that is proportional to the cosine of the phase difference between the first and second mixed components of the wave. The orientation of the quarter wave plate 2334 is adjusted to optimize the sensitivity to lubricant, carbon wear, other film thickness changes or changes in phase due to the presence of defects. The individual components may also be measured; that is, the first and second mixed components of the 45 degrees polarized light. These are measured simultaneously with the phase shift and the scattered light.

When the half wave plate is rotated so that the polarization is adjusted to S polarization the instrument will be able to measure the S specular and the S scattered light and, as a result, obtain the surface roughness and other properties of the sample. The S specular signal is given by the sum of the signal from detector 2340 and detector 2342. The angle of incidence shown in FIG. 23 is 58 degrees but angles greater or less than 58 degrees will work as well. The longitudinal or polar Kerr effect can be measured by operating the instrument in any of the linear polarization's, i.e., P, S or 45 degree linear. Rotating the quarter wave plate 2334 to achieve maximum sensitivity to the magnetic pattern optimizes the Kerr effect signal. The orientation of the quarter wave plate which optimizes the Kerr effect may be different from that which optimizes for lubricant and carbon sensitivity. As a result the quarter wave plate is made to be removable, for example, so that two different and separately optimized plates can be used for the different applications. A different embodiment would have a miniature motor to rotate the orientation of the quarter wave plate so as to optimize the signal for the Kerr effect, lubricant, carbon or defect detection mode. Different polarizations may require a different quarter wave plate adjustment to achieve optimization. When in this mode the instrument functions as a Kerr effect microscope. In one embodiment the S polarization is used to image the longitudinal Kerr effect. In another embodiment S polarization is used to image the polar Kerr effect. When the surface is imaged by the OSA in S linear polarization the reflected light has its polarization converted to elliptical polarization whose major axis is rotated depending upon the orientation of the magnetization upon the thin film disk. This Kerr effect signal is detected by measuring the two signals coming from the polarization beam splitter and subtracting them. This will give a signal whose sign is related to the direction of the magnetization and whose amplitude is proportion to the magnetization.

The data collected by the scattered radiation collection assembly and the reflected radiation collection assembly is fed to a processing module 2360 that includes a processor 2366, a memory module 2362, and an I/O module 2364. Processor module 2360 comprises logic instructions that enable the instrument described in FIG. 23 to simultaneously measure the profile (height and depth) of the surface, the S and P components of the reflectivity, the phase shift between the P and S waves and the scattered light. It is also capable of measuring the Magneto-optic Kerr effect to obtain an image of the magnetic characteristics of the surface of a disk 2320.

Figure 14:
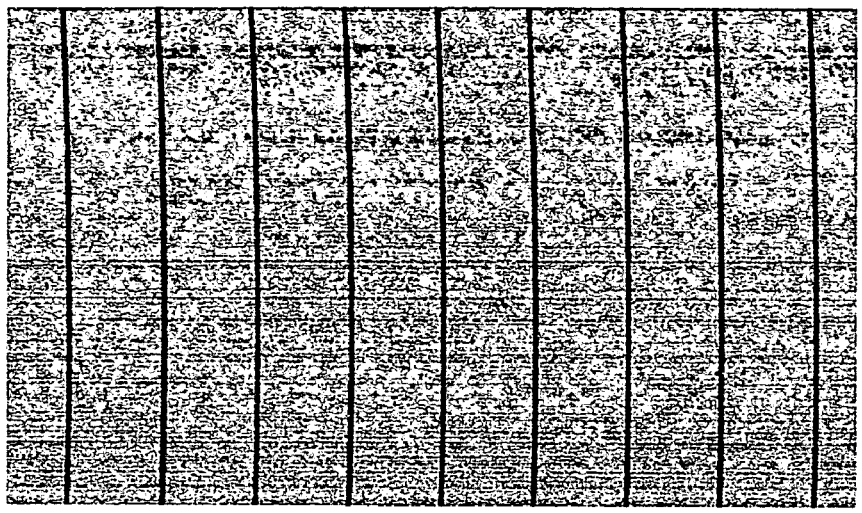
FIG. 14 is a schematic illustration of an image of the magnetic characteristics of a section of a disk.

FIG. 14 is a schematic illustration of an image of the magnetic characteristics of a section of a disk. The servo arcs appear as a series of dark lines imaged against the background magnetic noise of the surface.

Figure 15:
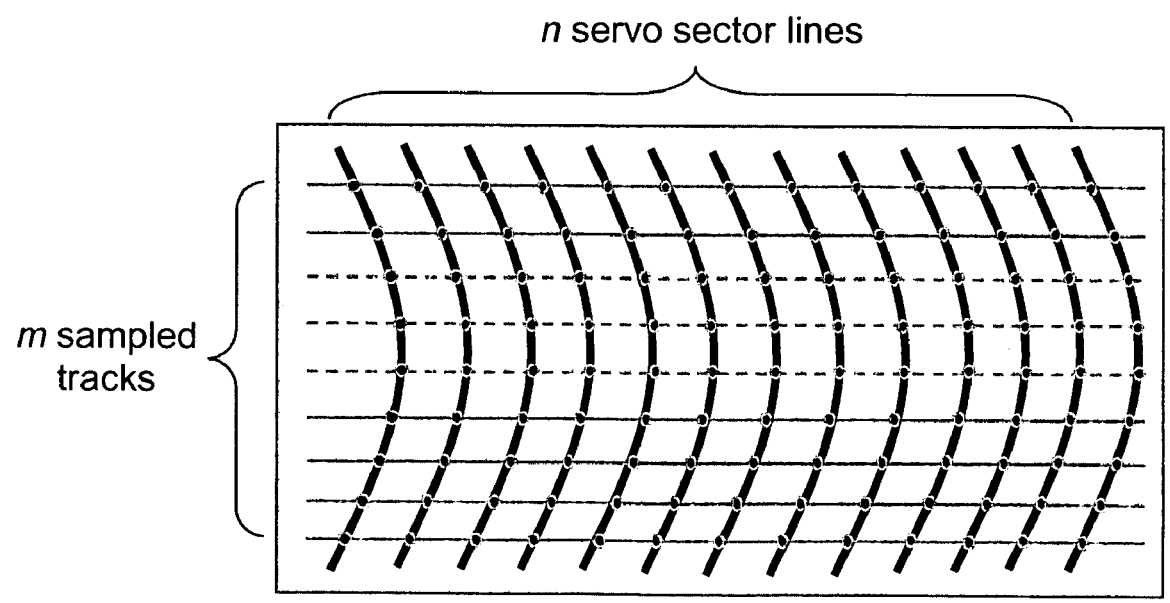
FIG. 15 is a schematic illustration of servo lines on a magnetic disk.
Figure 16:
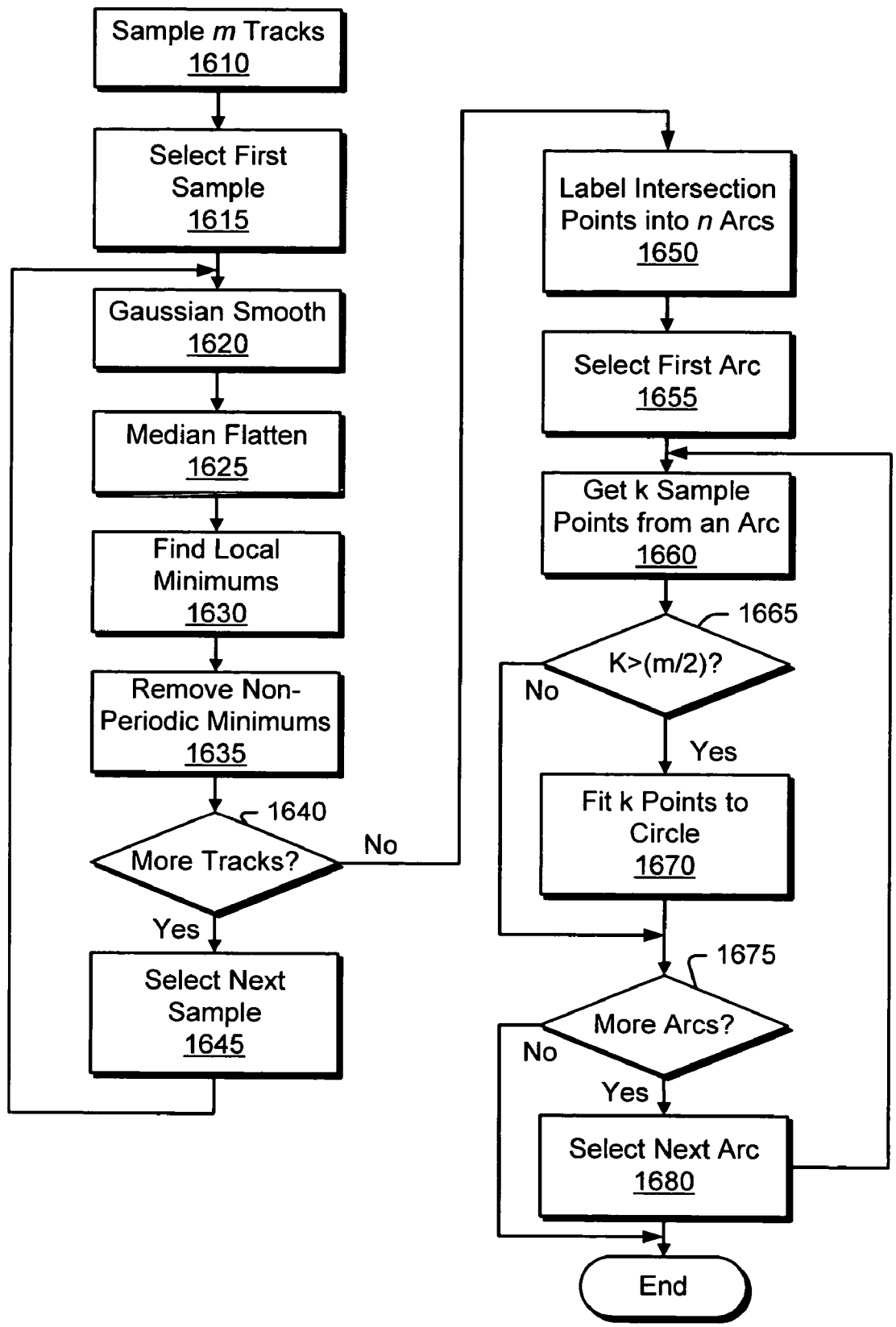
FIG. 16 is a flowchart illustrating operations in one embodiment of a technique for servo patter characterization on magnetic disks.

One embodiment of a technique for servo patter characterization on magnetic disks will be explained with reference to FIGS. 15-16. FIG. 16 is a flowchart illustrating operations in one embodiment of a technique for servo patter characterization on magnetic disks, and FIG. 15 is a schematic illustration of servo lines on a magnetic disk. At operation 1610, a sample of m tracks of image data on the surface of the disk is selected. Referring to FIG. 15, the m tracks may traverse a sample of n servo sector arcs. Each track consists of one row sub-image, d.

Figure 17:
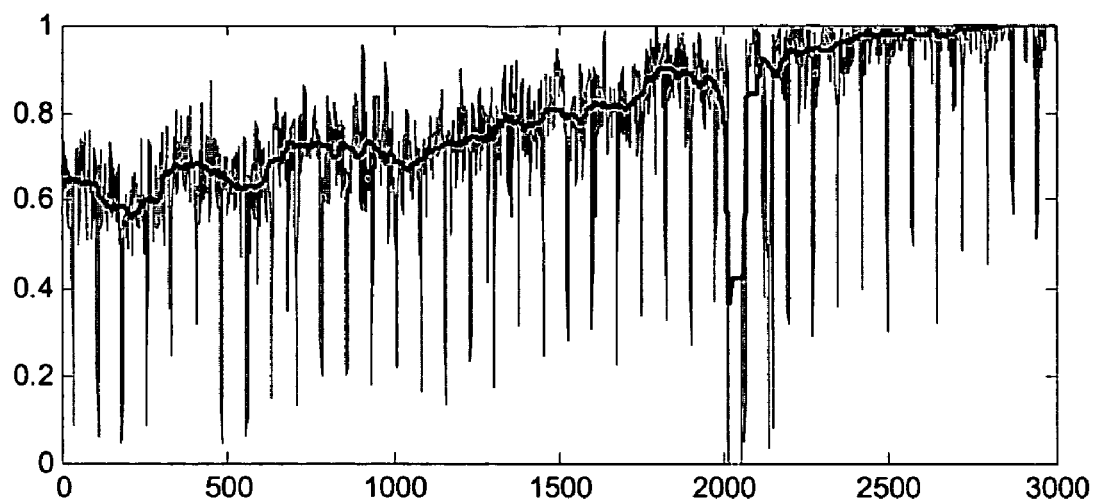
FIG. 17 is an illustration of a smoothed data set.

At operation 1615 a first sample is selected. The sub-image d is subjected to a de-noising operation (Equation 1) by convolving the data with a Gaussian filter, G, to smooth the signal. The length and sigma of the Gaussian filter may be changed adaptively in response to changes in the image resolution on the circumferential direction, which is determined by the sampling rate of the image acquisition system. An example of smoothed data, $d_s$, is shown in FIG. 17.

$$d_s = d \circledX G(\text{length}, \sigma) \quad \text{(Equation 1)}$$

Figure 18:
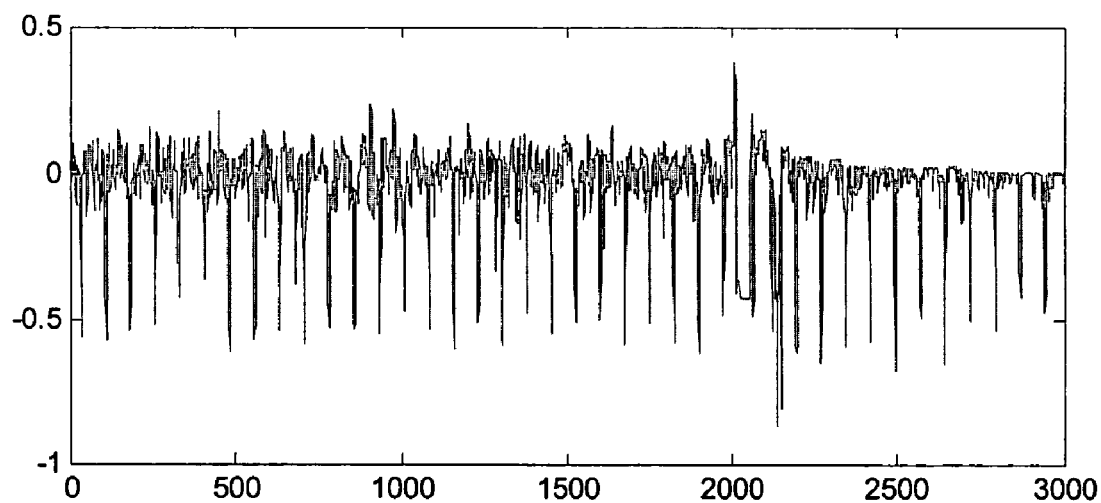
FIG. 18 is an illustration of a median-filtered, flattened data set.

At operation 1625 a median filter may be applied to the data in the sample to remove one or more global irregularities. One embodiment of a median filter is illustrated in Equation (2), in which $d_s$ represents the smoothed data from Equation 1, $d_f$ is flattened data. The neighborhood size of the median filter may be a fixed number selected empirically. FIG. 18 is a schematic illustration of a median-filtered, flattened data set.

$$d_f = d_s - \text{median}(d_s) \quad \text{(Equation 2)}$$

Figure 19:
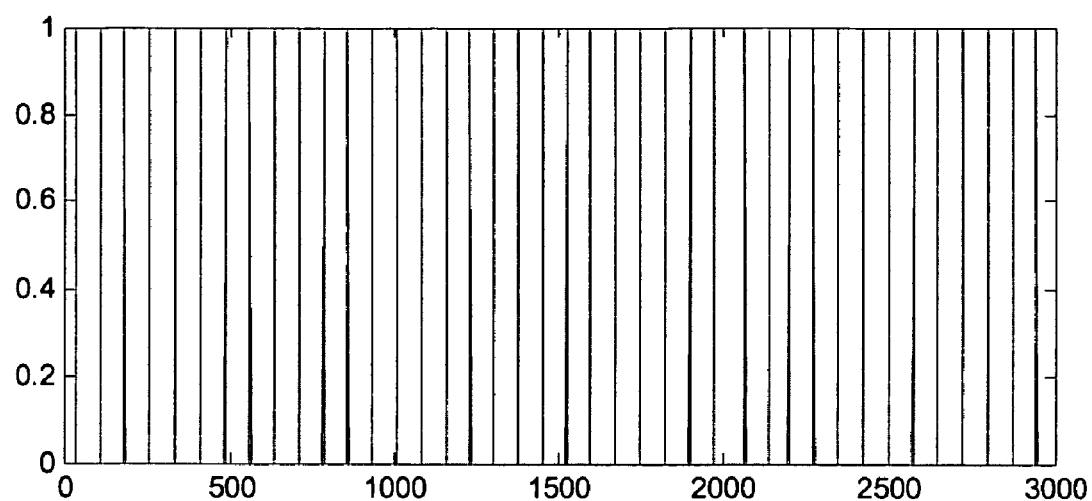
FIG. 19 is a schematic illustration of all the data points with local minimum values.

As shown in FIG. 14, servo sector lines appear darker in the magnetic image. Thus, the positions of these lines are indicated by the data points with local minimum values on the flattened data in FIG. 18. At operation 1630, the local minima of the flattened data are determined. In one embodiment, all the data points with minimum values in a sliding neighborhood are assigned a value of 1 while those non-minimum points are suppressed to 0. The size of the sliding neighborhood may be determined by the number of servo sector lines (n), which is given by the manufacturer. FIG. 19 is a schematic illustration of all the data points with local minimum values.

At operation 1635 non-periodic local minima are removed from the data sample. In most magnetic disks, servo sector lines are evenly distributed over the surface of the disk. Hence, the intervals between these local minimum data points should be approximately uniform, i.e., the local minimum data points should be approximately periodic. Hence, most non-periodic minimums are likely due to something other than a servo line such e.g., a defect in the media.

Figure 20:
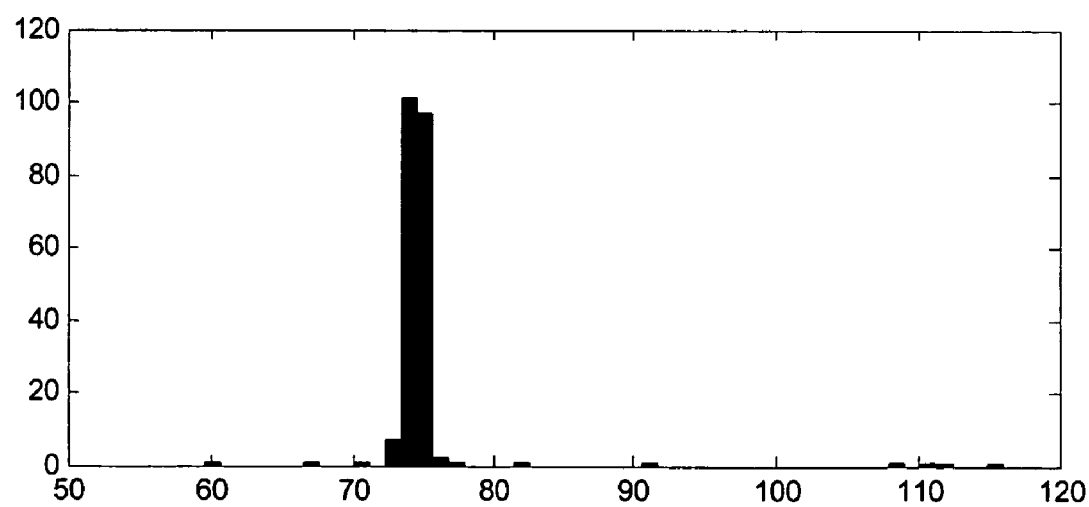
FIG. 20 is a histogram representing the intervals between two local minima in a data set.
Figure 21:
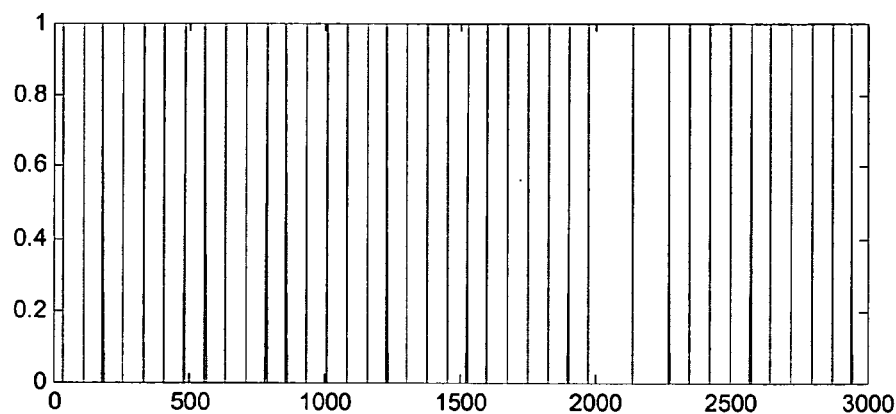
FIG. 21 is a schematic illustration of the data points with non-periodic local minimum values removed.

In one embodiment, a histogram of the intervals between two local minima may be constructed and used to distinguish local minimums from defects or other false signals. An exemplary histogram is illustrated in FIG. 20. Referring to FIG. 20, the histogram indicates that the interval between two servo sector lines should be around 74 pixels. Local minimums with intervals that differ significantly from 74 are considered non-periodic local minimums and thereafter removed from the local minimums list. In alternate embodiments an average interval may be used instead of a histogram, and local minimums that differ from the average by a threshold value may be removed from the data set. FIG. 21 is a schematic illustration of the data points with non-periodic local minimum values removed. All the local minimums left may be used to represent the locations of the servo sector lines on this track.

If, at operation 1640, there are more tracks to process, then control passes to operation 1645 and the next sample is selected for processing. Thus, operations 1620-1645 define a loop by which the track samples are processed to identify the local minimums which correspond to the servo arc.

Figure 22:
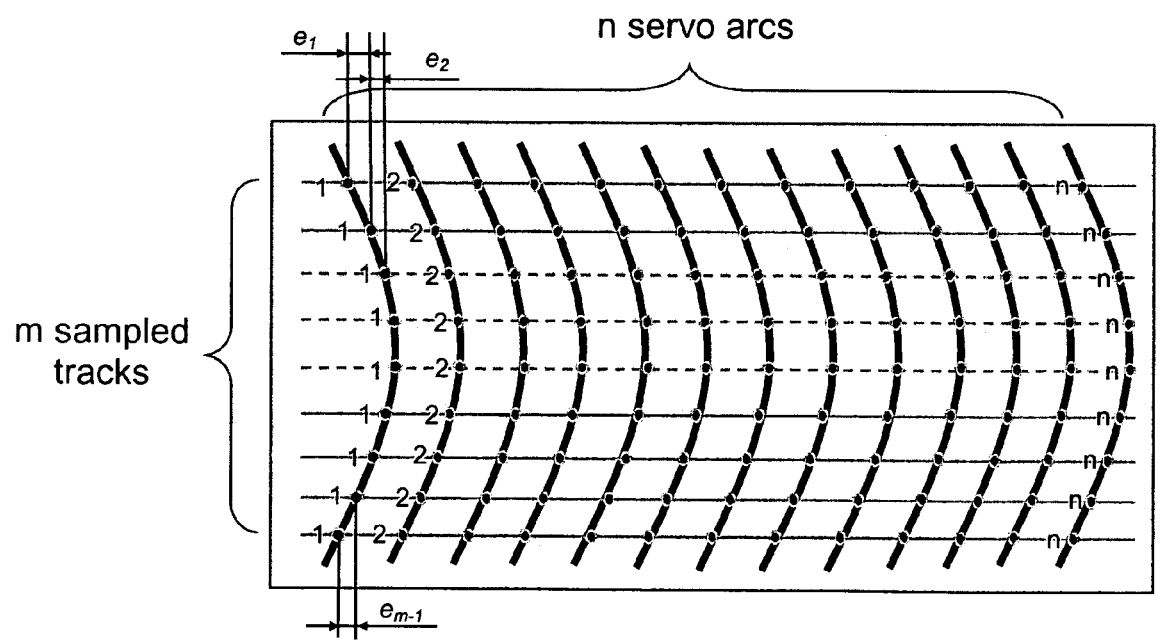
FIG. 22 is a schematic illustration of a technique for identifying points on a servo arc.

By contrast, if at operation 1640 there are no more tracks to process, then control passes to operation 1650 and the intersection points are labeled into a number n arcs. The points may be labeled by starting at the "upper" track, and then tracking downward from the top of each servo sector line to the bottom, searching for closest data points along the search path having a value (e.g., a 1) that indicates a local minimum. In one embodiment, a difference array $E=\{e_i\}$, $i=1, \ldots, m-1$ of size (m−1) may be constructed. Each element of the array, $e_i$, denotes the horizontal difference of two adjacent intersection points on one servo sector line, as illustrated in FIG. 22. This difference array may be used as a guide to direct the searching path to roughly track along the servo sector lines.

At operation 1655 a first arc is selected and at operation 1660 a collection of k sample points are collected from the selected arc. If at operation 1665, the number samples k is selected such that k>(m/2) control passes to operation 1670 and the points labeled as belonging to one servo sector line are taken out and fit into a circle which results in the center and the radius of the circle. One technique for fitting a circle to the data points is incorporated by reference above.

If, at operation 1675 there are more arcs in the sample, then control passes to operation 1675 and the next arc is selected, and control passes back to operation 1660. Thus, operations 1655-1680 for a loop by which a circle is fitted to each servo sector arc.

Because all the servo sector lines are generated from an identical process, theoretically, these fitted circles should have approximately the same radius, which corresponds to the pivot-to-gap distance. In one embodiment, an average of the radii of all the circles may be calculated as a pivot-to-gap distance measurement.

$$\text{Pivot To Gap} = \text{average}(r_i), i=1, \ldots, n \quad \text{(Equation 3)}$$

A center-to-center distance measurement, s, is defined as the distance between the actuator pivot and the center of the magnetic pattern, A. The method to measure the center of the magnetic pattern is described above. The distance, $s_i$, between the center of each fitted circle, ($B_i$), to the center of the magnetic pattern (A) is determined. The center-to-center distance measurement is measured as the average of $s_i$.

$$\text{Center To Center} = \text{average}(s_i), s_i = |AB_i|, i=1, \ldots, n \quad \text{(Equation 4)}$$

In one embodiment the operations illustrated in FIG. 16 may be implemented as logic instructions recorded in a computer-readable medium such as, e.g., the memory 2362 of computing device 2360. When executed by processor 2366, the processor is configured to perform the operations illustrated in FIG. 16. The pivot-to-gap distance measurement and/or the center-to-center distance measurement may be presented via a suitable interface such as, e.g., a display or a printer, via I/O module 2364.

Figure 24:
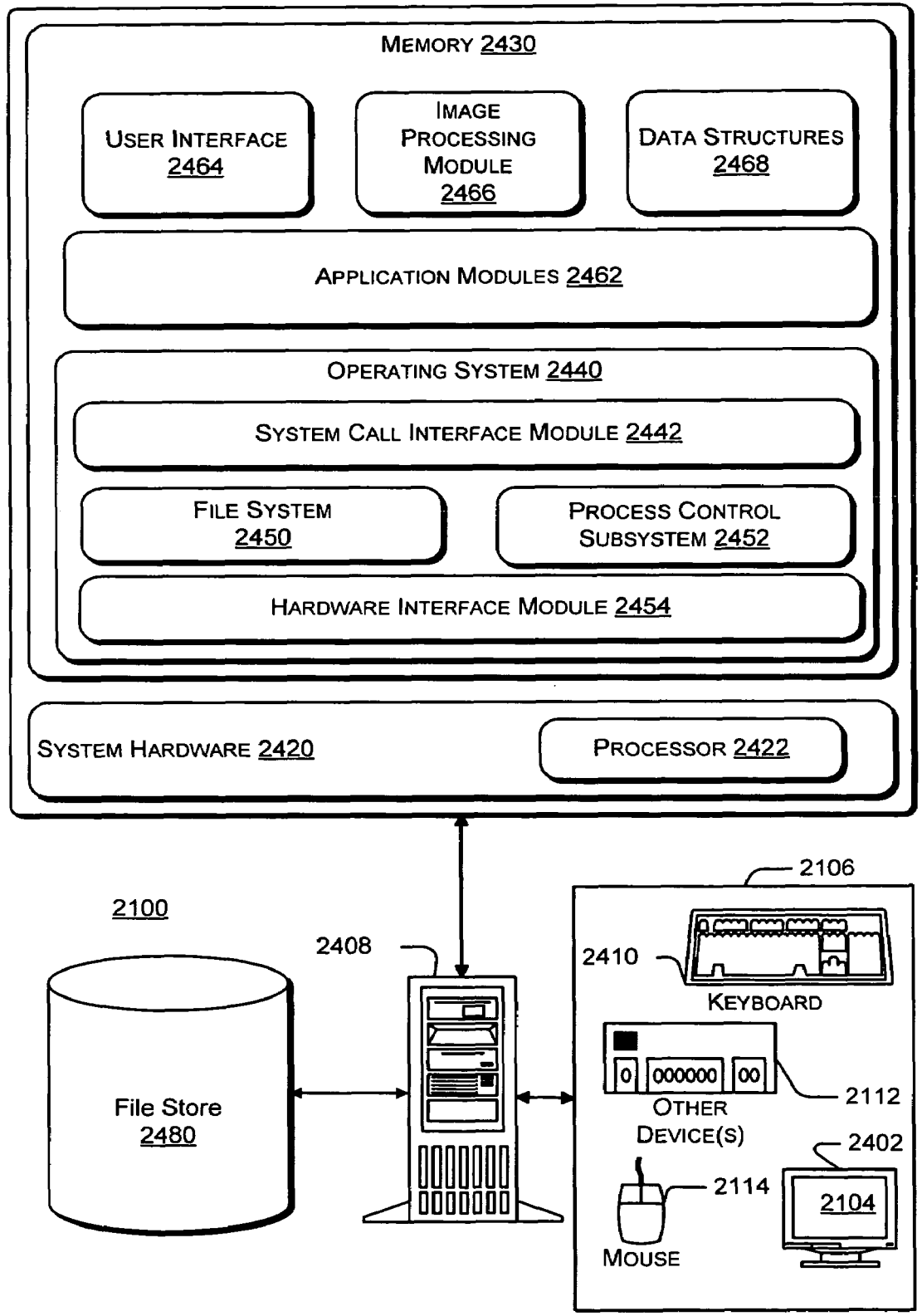
FIG. 24 is a schematic illustration of an exemplary computer system adapted to implement servo pattern characterization on magnetic disks.

In another embodiment, the operations of FIG. 16 may be performed in a separate computing device that may receive scanning data from an optical surface analyzer as depicted in FIG. 23. FIG. 24 is a schematic illustration of an exemplary computer system 2400 adapted to implement servo pattern characterization on magnetic disks. The computer system 2400 includes a computer 2408 and one or more accompanying input/output devices 2406 including a display 2402 having a screen 2404, a keyboard 2410, other I/O device(s) 2412, and a mouse 2414. The other device(s) 2412 can include a touch screen, a voice-activated input device, a track ball, and any other device that allows the system 2400 to receive input from a developer and/or a user. The computer 2408 includes system hardware 2420 and random access memory and/or read-only memory 2430. A file store 2480 may be coupled to computer 2408. File store 2480 may be internal such as, e.g., one or more hard drives, or external such as, e.g., one or more external hard drives, network attached storage, or a separate storage network.

System hardware 2420 may include one or more processors 2422. Memory 2430 includes an operating system 2440 for managing operations of computer 2408. In one embodiment, operating system 2440 includes a hardware interface module 2454 that provides an interface to system hardware 2420. In addition, operating system 2440 includes one or more file systems 2450 that managed files used in the operation of computer 2408 and a process control subsystem 2452 that manages processes executing on computer 2408. Operating system 2440 further includes a system call interface module 2442 that provides an interface between the operating system 2440 and one or more application modules 2462.

In operation, one or more application modules and/or libraries executing on computer 2408 make calls to the system call interface module 2442 to execute one or more commands on the computer's processor. The system call interface module 2442 invokes the services of the file systems 2450 to manage the files required by the command(s) and the process control subsystem 2452 to manage the process required by the command(s). The file system(s) 2450 and the process control subsystem 2452, in turn, invoke the services of the hardware interface module 2454 to interface with the system hardware 2420.

The particular embodiment of operating system 2440 is not critical to the subject matter described herein. Operating system 2440 may be embodied as a UNIX operating system or any derivative thereof (e.g., Linux, Solaris, etc.) or as a Windows® brand operating system.

In one embodiment, memory 2430 one or more application modules 2462 that execute on operating system 2440. The particular operation(s) of application modules 2462 are not important to the subject matter described herein. Memory 2430 may further include one or more user interface modules 2464 that provide a user interface to the one or more application modules 2462.

In one embodiment, memory 2430 may further include an image processing module 2466 that includes logic instructions which, when executed, configure the one or more processors to implement operations servo pattern characterization on magnetic disks such as, e.g., the operations of FIG. 16. In alternate embodiments, operational logic 2466 may be implemented in hard-wired circuitry in computing device 2400.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method of characterizing a servo pattern on a magnetic disk, comprising:
    acquiring an image of magnetic characteristics of the magnetic disk, wherein the image comprises a plurality of servo sector arcs;
    locating a sample of points on a plurality of the servo sector arcs;
    fitting a circle to the sample of points on each of the plurality of servo sector arcs;
    determining at least one pivot-to-gap measurement from the radius of the circles, wherein locating a sample of points on a plurality of the servo sector arcs comprises:
    selecting a plurality of sample track data from the magnetic disk;
    applying a smoothing function to the sample track data;
    applying a flattening function to the sample track data; and
    locating local minimums in the sample track data.

2. The method of claim 1, wherein acquiring an image of magnetic characteristics of the magnetic disk comprises:
    scanning a portion of the surface of the magnetic disk with an optical surface analyzer;
    measuring a Kerr effect from radiation reflected from the surface of the magnetic disk.

3. The method of claim 1, farther comprising determining at least one center-to-center measurement from the distance between the center of the circles and a magnetic center of the disk.

4. The method of claim 3, farther comprising presenting the at least one pivot-to-gap measurement and the at least one center-to-center measurement via an output device.

5. The method of claim 1, wherein acquiring an image of magnetic characteristics of the magnetic disk comprises:
    scanning a portion of the surface of the magnetic disk with an optical surface analyzer;

measuring the scattered radiation from the surface of the magnetic disk.

6. The method of claim 5, wherein the polarization of the incident beam is adjusted to P, S or 45 degree linear polarization.

7. A surface analyzer system, comprising:
a radiation targeting assembly to target radiation onto a surface; and
a reflected radiation collecting assembly that collects radiation reflected from the surface; and
a signal processing module to:
generate an image of magnetic characteristics of the magnetic disk, wherein the image comprises a plurality of servo sector arcs;
locate a sample of points on a plurality of the servo sector arcs;
fit a circle to the sample of points on each of the plurality of servo sector arcs; and
determine at least one pivot-to-gap measurement from the radius of the circles;
select a plurality of sample track data from the magnetic disk;
apply a smoothing function to the sample track data;
apply a flattening function to the sample track data; and
locate local minimums in the sample track data.

8. The surface analyzer system of claim 7, wherein the signal processing module measures a Kerr effect from radiation reflected from the surface of the magnetic disk.

9. The surface analyzer system of claim 7, wherein the signal processing module determines at least one center-to-center measurement from the distance between the center of the circles and a magnetic center of the disk.

10. The surface analyzer system of claim 9, wherein the signal processing module presents the at least one pivot-to-gap measurement and the at least one center-to-center measurement via an output device.

11. A computer program product comprising logic instructions stored on a computer-readable medium which, when executed, configure a processor to:
analyze an image of magnetic characteristics of the magnetic disk, wherein the image comprises a plurality of servo sector arcs;
locate a sample of points on a plurality of the servo sector arcs;
fit a circle to the sample of points on each of the plurality of servo sector arcs;
determine at least one pivot-to-gap measurement from the radius of the circles;
select a plurality of sample track data from the magnetic disk;
apply a smoothing function to the sample track data;
apply a flattening function to the sample track data; and
locate local minimums in the sample track data.

12. The computer program product of claim 11, further comprising logic instructions stored on a computer-readable medium which, when executed, configure a processor to:
direct an optical surface analyzer to scan a portion of the surface of the magnetic disk with an optical surface analyzer; and
measure a Kerr effect from radiation reflected from the surface of the magnetic disk.

13. The computer program product of claim 11, further comprising logic instructions stored on a computer-readable medium which, when executed, configure an optical surface analyzer to determine at least one center-to-center measurement from the distance between the center of the circles and a magnetic center of the disk.

14. The computer program product of claim 13, further comprising logic instructions stored on a computer-readable medium which, when executed, configure an optical surface analyzer to presenting the at least one pivot-to-gap measurement and the at least one center-to-center measurement via an output device.

15. A surface analyzer system, comprising:
a radiation targeting assembly to target radiation onto a surface of a magnetic disk; and
a reflected radiation collecting assembly that collects radiation reflected from the surface; and
a signal processing module to determine a distance between a center of one or more circles defined by a magnetic pattern on the magnetic disk and a magnetic center of the disk from an image of magnetic characteristics of the magnetic disk; wherein the signal processing module:
selects a plurality of sample track data from the magnetic disk;
applies a smoothing function to the sample track data;
applies a flattening function to the sample track data; and
locates local minimums in the sample track data.

16. The surface analyzer system of claim 15, wherein the signal processing module measures a Kerr effect from radiation reflected from the surface of the magnetic disk.

17. The surface analyzer system of claim 15, wherein the signal processing module:
generates an image of magnetic characteristics of the magnetic disk, wherein the image comprises a plurality of servo sector arcs;
locates a sample of points on a plurality of the servo sector arcs;
fits a circle to the sample of points on each of the plurality of servo sector arcs; and
determines at least one pivot-to-gap measurement from the radius of the circles.

* * * * *